(12) United States Patent
Ham et al.

(10) Patent No.: US 11,773,196 B2
(45) Date of Patent: Oct. 3, 2023

(54) ETHYLENE POLYMER MIXTURE, METHOD OF PREPARING THE SAME, AND MOLDED ARTICLE USING THE SAME

(71) Applicant: Sabic SK Nexlene Company Pte. Ltd., Singapore (SG)

(72) Inventors: Hyeong Taek Ham, Daejeon (KR); Min Ho Jeon, Daejeon (KR); Choon Sik Shim, Daejeon (KR); Sang Bae Cheong, Daejeon (KR); Ji Hyun Bae, Daejeon (KR); Dae Ho Shin, Daejeon (KR); Maria Soliman, Schalbruch (DE); Priya Garg, Vaals (NL)

(73) Assignee: Sabic SK Nexlene Company Pte. Ltd., Singapore (SG)

( * ) Notice: Subject to any disclaimer, the term of this patent is extended or adjusted under 35 U.S.C. 154(b) by 349 days.

(21) Appl. No.: 15/734,240

(22) PCT Filed: Jun. 5, 2019

(86) PCT No.: PCT/IB2019/054651
§ 371 (c)(1),
(2) Date: Dec. 2, 2020

(87) PCT Pub. No.: WO2019/234637
PCT Pub. Date: Dec. 12, 2019

(65) Prior Publication Data
US 2021/0163642 A1    Jun. 3, 2021

(30) Foreign Application Priority Data
Jun. 8, 2018    (KR) ........................ 10-2018-0065969

(51) Int. Cl.
*C08L 23/16* (2006.01)
*C08L 23/08* (2006.01)
(Continued)

(52) U.S. Cl.
CPC .......... *C08F 210/16* (2013.01); *B32B 27/327* (2013.01); *C08F 2/001* (2013.01);
(Continued)

(58) Field of Classification Search
CPC ..... C08F 210/16; C08L 23/0815; C08L 23/16
See application file for complete search history.

(56) References Cited

U.S. PATENT DOCUMENTS

| 4,798,081 A | 1/1989 | Hazlitt et al. |
| 5,089,321 A | 2/1992 | Chum et al. |

(Continued)

FOREIGN PATENT DOCUMENTS

| EP | 1023390 B1 | 2/2004 |
| EP | 2918635 A1 | 9/2015 |

(Continued)

OTHER PUBLICATIONS

Li et al., "Nuclearity and cooperativity effects in binuclear catalysts and cocatalysts for olefin polymerization", PNAS, Oct. 17, 2006, pp. 15295-15302, vol. 103, No. 42.

(Continued)

*Primary Examiner* — Rip A Lee
(74) *Attorney, Agent, or Firm* — THE WEBB LAW FIRM

(57) ABSTRACT

Provided are an ethylene polymer mixture, a method of preparing the same, and a molded article using the same. More specifically, an ethylene polymer mixture in which two ethylene polymers having different densities are mixed, a method of preparing the same, and a molded article having a low haze and a low heat sealing temperature using the ethylene polymer mixture, are provided.

20 Claims, 3 Drawing Sheets

(51) Int. Cl.
   *C08F 210/16* (2006.01)
   *B32B 27/32* (2006.01)
   *C08F 2/00* (2006.01)
   *C08F 4/659* (2006.01)
   *C08F 4/6592* (2006.01)

(52) U.S. Cl.
   CPC ........ *C08F 4/6592* (2013.01); *C08F 4/65908* (2013.01); *C08F 4/65912* (2013.01); *C08L 23/0815* (2013.01); *C08L 23/16* (2013.01); *B32B 2307/31* (2013.01); *B32B 2307/558* (2013.01); *B32B 2307/732* (2013.01); *B32B 2439/70* (2013.01); *C08F 2420/00* (2013.01); *C08L 2201/10* (2013.01); *C08L 2203/162* (2013.01); *C08L 2203/30* (2013.01); *C08L 2205/025* (2013.01)

(56) References Cited

U.S. PATENT DOCUMENTS

| | | | |
|---|---|---|---|
| 5,198,401 A | | 3/1993 | Turner et al. |
| 6,969,741 B2 | * | 11/2005 | Lustiger .............. C08L 23/0815 264/312 |
| 8,247,497 B2 | | 8/2012 | Wilson et al. |
| 8,481,647 B2 | | 7/2013 | Jiang et al. |
| 10,246,579 B2 | | 4/2019 | Daniere et al. |
| 11,174,377 B2 | * | 11/2021 | Kababik .............. C08L 23/0815 |
| 11,384,229 B2 | * | 7/2022 | Demirors ............ C08L 23/0815 |
| 2010/0113729 A1 | | 5/2010 | Kwon et al. |
| 2012/0015123 A1 | | 1/2012 | Kwon et al. |
| 2016/0229996 A1 | | 8/2016 | Yamane et al. |
| 2018/0305530 A1 | * | 10/2018 | Wang .................. C08L 23/0815 |
| 2020/0392269 A1 | * | 12/2020 | Ferrari ....................... C08J 5/18 |

FOREIGN PATENT DOCUMENTS

| | | |
|---|---|---|
| JP | 2001512770 A | 8/2001 |
| JP | 2006517607 A | 7/2006 |
| JP | 2014505155 A | 2/2014 |
| JP | 2014517012 A | 7/2014 |
| KR | 1020100049479 A | 5/2010 |
| KR | 1020120007718 A | 1/2012 |
| KR | 1020120031211 A | 3/2012 |
| WO | 2010030145 A2 | 3/2010 |
| WO | 2016076509 A1 | 5/2016 |
| WO | 2018193328 A1 | 10/2018 |

OTHER PUBLICATIONS

Wild et al., "Determination of Branching Distributions in Polyethylene and Ethylene Copolymers", Journal of Polymer Science: Polymer Physics Edition, 1982, pp. 441-455, vol. 20.

* cited by examiner

ETHYLENE POLYMER MIXTURE, METHOD OF PREPARING THE SAME, AND MOLDED ARTICLE USING THE SAME

CROSS-REFERENCE TO RELATED APPLICATIONS

This application is the United States national phase of International Application No. PCT/IB2019/054651 filed Jun. 5, 2019, and claims priority to Korean Patent Application No. 10-2018-0065969 filed Jun. 8, 2018, the disclosures of which are hereby incorporated by reference in their entirety.

TECHNICAL FIELD

The present invention relates to an ethylene polymer mixture, a method of preparing the same, and a molded article using the same. More specifically, the present invention relates to an ethylene polymer mixture in which two ethylene polymers having different densities are mixed, a method of preparing the same, and a molded article having a low haze and a low heat sealing temperature, using the ethylene polymer mixture.

BACKGROUND ART

Recently, as a demand for food packaging is increased, packaging materials which are hygienic and has excellent physical properties such as transparency and impact strength at a low temperature are required in the market. Since an ethylene copolymer used for food packaging and the like is used in an innermost layer in a multilayer film for food packaging, that is, in a surface in direct contact with contents, properties such as an excellent heat sealing property at a low temperature, excellent transparency, and an excellent hygiene property are demanded.

The present applicant has filed Korean Patent Laid-Open Publication Nos. 10-2010-0049479 (May 12, 2010), 10-2012-0007718 (Jan. 25, 2012), and 10-2012-0031211 (Mar. 30, 2012), for an ethylene copolymer for a hygienic injection food container having excellent impact resistance with high stiffness.

However, as packaging technology requires higher quality, properties such as a better heat sealing property at a low temperature and better transparency as compared with a conventional ethylene copolymer are demanded.

RELATED ART DOCUMENTS

Patent Documents

Korean Patent Laid-Open Publication No. 10-2010-0049479 (May 12, 2010)
Korean Patent Laid-Open Publication No. 10-2012-0007718 (Jan. 25, 2012)
Korean Patent Laid-Open Publication No. 10-2012-0031211 (Mar. 30, 2012)

DISCLOSURE

Technical Problem

An object of the present invention is to provide an ethylene polymer mixture which has a lower heat sealing temperature, excellent strength at the time of heat sealing, and better transparency as compared with products manufactured using one ethylene-based copolymer having the same density, melt index, and molecular weight distribution and a product manufactured using the conventional metallocene and Ziegler-Natta catalysts, thereby being applied to high-quality products.

Another object of the present invention is to provide a molded article having a lower heat sealing temperature, better mechanical strength, and a lower haze to have excellent transparency as compared with conventional products, by using the ethylene polymer mixture, and more specifically to provide a molded article such as a film, a sheet, and a food container.

Technical Solution

As a result of conducting a study for achieving the above objects, it was found that when two ethylene polymers having densities which are in a specific range and different from each other are mixed and used, and a molecular weight distribution of the mixture is adjusted to a specific range, a molded article having an improved heat sealing property at a low temperature, improved strength, and better transparency was able to be manufactured.

In one general aspect, an ethylene polymer mixture includes two ethylene polymers having densities satisfying the following Equations 1 to 3, wherein the ethylene polymer mixture has a molecular weight distribution of 2 to 3:

$$0.87 \leq M_1 \leq 0.90 \qquad \text{[Equation 1]}$$

$$0.90 \leq M_2 \leq 0.92 \qquad \text{[Equation 2]}$$

$$0.015 \leq M_2 - M_1 \leq 0.030 \qquad \text{[Equation 3]}$$

wherein $M_1$ is a density of the first ethylene polymer, $M_2$ is a density of the second ethylene polymer, the density is measured in accordance with ASTM D-792, and a unit of the density is g/cc.

In another general aspect, a molded article manufactured using the ethylene polymer mixture is provided.

In another general aspect, a multilayer film for food packaging includes at least one layer of film or sheet manufactured using the ethylene polymer mixture.

In still another general aspect, a method of preparing an ethylene polymer mixture includes: polymerizing ethylene and a C3-C18 α-olefin comonomer in the presence of a first metallocene catalyst in a first reactor to prepare a first ethylene polymer; and polymerizing ethylene and a C3-C18 α-olefin comonomer in the presence of a second metallocene catalyst in a second reactor to prepare a second ethylene polymer, wherein the first ethylene polymer and the second ethylene polymer have densities satisfying the following Equations 1 to 3 and the ethylene polymer mixture has a molecular weight distribution of 2 to 3:

$$0.87 \leq M_1 \leq 0.90 \qquad \text{[Equation 1]}$$

$$0.90 \leq M_2 \leq 0.92 \qquad \text{[Equation 2]}$$

$$0.015 \leq M_2 - M_1 \leq 0.030 \qquad \text{[Equation 3]}$$

wherein $M_1$ is a density of the first ethylene polymer, $M_2$ is a density of the second ethylene polymer, the density is measured in accordance with ASTM D-792, and a unit of the density is g/cc.

Advantageous Effects

The ethylene polymer mixture according to the present invention has effects of an excellent hygiene property, excellent impact resistance at a low temperature, being transparent, and excellent heat sealing property at a low temperature.

Accordingly, the ethylene polymer mixture may be appropriately used in a molded article such as food packaging and has an effect of further improving productivity and storage stability.

In addition, the ethylene polymer mixture according to the present invention has a lowest sealing temperature having the same heat-seal and hot-tack strength which is lower than that of a conventional ethylene copolymer and homopolymer, thereby providing a film or sheet for food packaging for heat sealing at a low temperature or high-speed packaging.

In addition, the ethylene polymer mixture according to the present invention has a lowest sealing temperature having the same heat-seal and hot-tack strength which is lower than that of the polymer mixture of an ethylene copolymer prepared using a metallocene catalyst and an ethylene copolymer prepared using a Ziegler-Natta catalyst, and has a further lower haze, thereby providing a film or sheet for food packaging having excellent transparency.

DESCRIPTION OF DRAWINGS

The above and other objects, features and advantages of the present invention will become apparent from the following description of preferred embodiments given in conjunction with the accompanying drawings, in which.

BEST MODE

Figure 1:
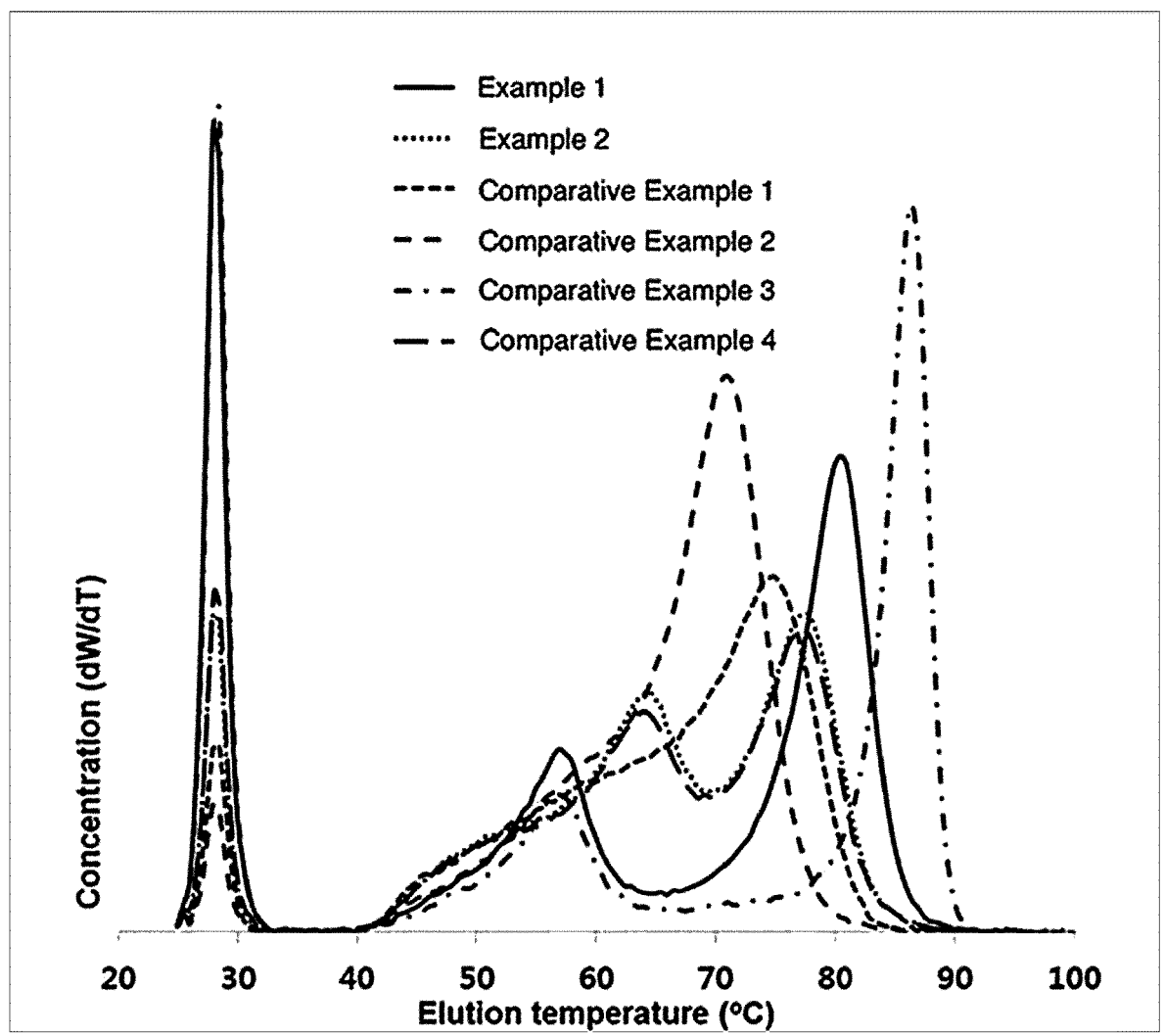
FIG. 1 is a graph of TREF measurement of resin mixtures of the Examples and the Comparative Examples of the present invention.

Hereinafter, the present invention will be described in more detail with reference to the exemplary embodiments or Examples including the accompanying drawings. However, the following exemplary embodiments or Examples are only a reference for describing the present invention in detail, and the present invention is not limited thereto, and may be implemented in various forms.

In addition, unless otherwise defined, all technical terms and scientific terms have the same meanings as those commonly understood by a person skilled in the art to which the present invention pertains. The terms used herein are only for effectively describing a certain exemplary embodiment, and are not intended to limit the present invention.

In addition, the singular form used in the specification and claims appended thereto may be intended to also include a plural form, unless otherwise indicated in the context.

In the present invention, the term, "polymer" is a polymerized compound prepared by polymerizing monomers. Specifically, the polymer includes a homopolymer, a copolymer, a terpolymer, an interpolymer, and the like. The "interpolymer" refers to a polymer prepared by polymerizing two or more monomers different from each other. Therefore, the generic term, interpolymer, includes not only a copolymer but also a terpolymer. The copolymer refers to a polymer prepared from two monomers different from each other, and the terpolymer refers to a polymer prepared from three monomers different from each other.

According to an exemplary embodiment, an ethylene polymer mixture including two ethylene polymers having densities satisfying the following Equations 1 to 3, wherein the ethylene polymer mixture has a molecular weight distribution of 2 to 3, is provided:

$$0.87 \leq M_1 \leq 0.90 \quad \text{[Equation 1]}$$

$$0.90 \leq M_2 \leq 0.92 \quad \text{[Equation 2]}$$

$$0.015 \leq M_2 - M_1 \leq 0.030 \quad \text{[Equation 3]}$$

wherein $M_1$ is a density of the first ethylene polymer, $M_2$ is a density of the second ethylene polymer, the density is measured in accordance with ASTM D-792, and the unit of the density is g/cc.

According to an exemplary embodiment, the ethylene polymer mixture may have a density in accordance with ASTM D-792 of 0.890 to 0.910 g/cc.

According to an exemplary embodiment, the first ethylene polymer may have a melt index satisfying the following Equation 4 and the second ethylene polymer may have a melt index satisfying the following Equation 5:

$$0.2 \leq MI_1 \leq 0.9 \quad \text{[Equation 4]}$$

$$1 \leq MI_2 \leq 3 \quad \text{[Equation 5]}$$

wherein $MI_1$ is a melt index of the first ethylene polymer, $MI_2$ is a melt index of the second ethylene polymer, and the melt index is measured at 190° C. under 2.16 kg in accordance with ASTM D 1238 and the unit of the melt index is g/10 min.

According to an exemplary embodiment, the first ethylene polymer and the second ethylene polymer may have a melt index satisfying the following Equation 6:

$$1 \leq MI_2/MI_1 \leq 5 \quad \text{[Equation 6]}$$

wherein $MI_2$ is a melt index of the second ethylene polymer, $MI_1$ is a melt index of the first ethylene polymer, the melt index is measured at 190° C. under 2.16 kg in accordance with ASTM D 1238, and the unit of the melt index is g/10 min.

According to an exemplary embodiment, the ethylene polymer mixture may include 30 to 60% by weight of the first ethylene polymer.

According to an exemplary embodiment, the first ethylene polymer and the second ethylene polymer may be an ethylene copolymer in which ethylene and a C3-C18 α-olefin comonomer are polymerized.

According to an exemplary embodiment, the α-olefin comonomer may be any one or a mixture of two or more selected from the group consisting of 1-propylene, 1-butene, 1-hexene, 1-heptene, and 1-octene.

According to an exemplary embodiment, the first ethylene polymer and the second ethylene polymer may be those polymerized in the presence of a metallocene catalyst.

According to an exemplary embodiment, the ethylene polymer mixture may satisfy the following Equation 7:

$$HS_1 + 10 \leq HS_2 \quad \text{[Equation 7]}$$

wherein $HS_1$ is a heat sealing temperature of the ethylene polymer mixture, $HS_2$ is a heat sealing temperature of one ethylene polymer having the same density, melt index, and molecular weight distribution as $HS_1$, and the unit of the temperature is ° C.

According to another exemplary embodiment of the present invention, a molded article manufactured using the ethylene polymer mixture is provided.

According to an exemplary embodiment, the molded article may be any one selected from the group consisting of a film, a sheet, and a food container.

According to an exemplary embodiment, the molded article may have a thickness of 10 to 250 μm and a haze in accordance with ASTM D 1003 of 5% or less.

According to an exemplary embodiment, the film may have a falling dart impact strength of 1700 g or more in accordance with ASTM D 1709 method A, a lowest sealing temperature of 75° C. or less at a hot-tack strength of 1.5 N/cm or more in accordance with ASTM F 1921, and a lowest sealing temperature of 85° C. or less at a heat-seal strength of 600 g or more in accordance with ASTM F 88.

According to another exemplary embodiment of the present invention, a multilayer film for food packaging including at least one layer of film or sheet manufactured using the ethylene polymer mixture is provided.

According to another exemplary embodiment of the present invention, a method of preparing an ethylene polymer mixture including: polymerizing ethylene and a C3-C18 α-olefin comonomer in the presence of a first metallocene catalyst in a first reactor to prepare a first ethylene polymer, and polymerizing ethylene and a C3-C18 α-olefin comonomer in the presence of a second metallocene catalyst in a second reactor to prepare a second ethylene polymer, is provided, wherein the first ethylene polymer and the second ethylene polymer have densities satisfying the following Equations 1 to 3 and the ethylene polymer mixture has a molecular weight distribution of 2 to 3:

$$0.87 \leq M_1 \leq 0.90 \quad \text{[Equation 1]}$$

$$0.90 \leq M_2 \leq 0.92 \quad \text{[Equation 2]}$$

$$0.015 \leq M_2 - M_1 \leq 0.030 \quad \text{[Equation 3]}$$

wherein $M_1$ is a density of the first ethylene polymer, $M_2$ is a density of the second ethylene polymer, the density is measured in accordance with ASTM D-792, the unit of the density is g/cc.

According to an exemplary embodiment, the first metallocene catalyst is a mixture of complexes represented by the following Chemical Formula 1 and 2, and the second metallocene catalyst may be a complex represented by the following Chemical Formula 3:

[Chemical Formula 1]

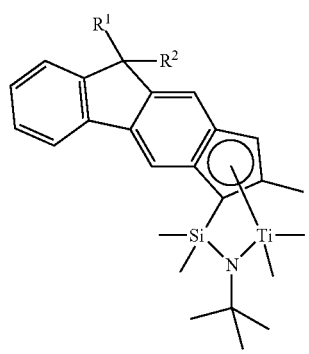

[Chemical Formula 2]

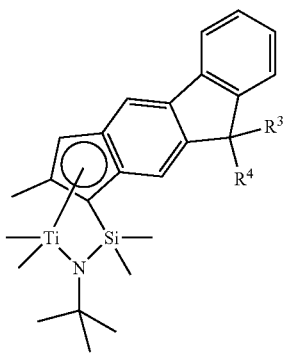

[Chemical Formula 3]

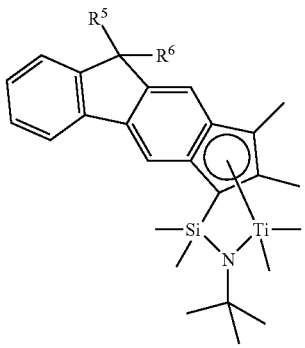

wherein $R^1$, $R^2$, $R^3$, $R^4$, $R^5$ and $R^6$ are $C_1$-$C_{30}$ alkyl independent of each other.

According to an exemplary embodiment, the first metallocene catalyst may be a mixture in which the complex represented by Chemical Formula 1 and the complex represented by Chemical Formula 2 are mixed at a weight ratio of 3:7 to 7:3.

According to an exemplary embodiment, polymerization may be performed so that the first ethylene polymer has a melt index satisfying the following Equation 4 and the second ethylene polymer has a melt index satisfying the following Equation 5:

$$0.2 \leq MI_1 \leq 0.9 \quad \text{[Equation 4]}$$

$$1 \leq MI_2 \leq 3 \quad \text{[Equation 5]}$$

wherein $MI_1$ is a melt index of the first ethylene polymer, $MI_2$ is a melt index of the second ethylene polymer, and the melt index is measured at 190° C. under 2.16 kg in accordance with ASTM D 1238 and the unit of the melt index is g/10 min.

According to an exemplary embodiment, in the polymerization step, the molecular weight may be controlled by injecting hydrogen.

According to an exemplary embodiment, in the polymerization step, any one or two or more cocatalysts selected from the group consisting of boron compounds and aluminum compounds may be further included.

According to an exemplary embodiment, the cocatalyst may be any one or a mixture thereof selected from the group consisting of triisobutylaluminum and triphenylmethyliumtetrakispentafluorophenylborate.

Hereinafter, configurations of the present invention will be described in detail.

The inventors of the present invention found that the first ethylene polymer and the second ethylene polymer have a specific density range and a specific range of density difference between them, and are mixed so as to have a specific range of molecular weight distribution, thereby providing a molded body having a better heat sealing property at a low temperature, better impact strength at a low temperature, and better transparency, and completed the present invention.

More specifically, an exemplary embodiment of the ethylene polymer mixture of the present invention may include the first ethylene polymer having a density of 0.87 to 0.90 g/cc, and more specifically 0.886 to 0.893 g/cc and the second ethylene polymer having a density of 0.90 to 0.92 g/cc, and more specifically 0.911 to 0.913 g/cc, as measured in accordance with ASTM D-792, in which a density difference between the first ethylene polymer and the second ethylene polymer is 0.015 to 0.030 g/cc, and more specifically 0.018 to 0.027 g/cc and a molecular weight distribution is 2 to 3, and more specifically 2.1 to 2.5. Within the ranges of density and molecular weight distribution satisfying the above range, a molded body, product, object and artifact having a better heat sealing property at a low temperature, better impact strength at a low temperature, and better transparency may be provided.

According to an exemplary embodiment, the first ethylene polymer and the second ethylene polymer may be an ethylene copolymer in which ethylene and a C3-C18 α-olefin comonomer are polymerized.

More specifically, the α-olefin comonomer may be any one or a mixture of two or more selected from the group consisting of propylene, 1-butene, 1-pentene, 4-methyl-1-pentene, 1-hexene, 1-octene, 1-decene, 1-dodecene, 1-tetradecene, 1-hexadecene, and 1-octadecene. More specifically, the α-olefin comonomer may be any one or a mixture of two or more selected from the group consisting of 1-propylene, 1-butene, 1-hexene, 1-heptene, and 1-octene. When the α-olefin comonomer is used, the α-olefin comonomer allows flowability to the ethylene homopolymer and a high molecular weight ethylene copolymer to be prepared, thereby capable of serving to improve mechanical properties such as impact resistance.

A content of the α-olefin comonomer included in 100% by weight of the ethylene copolymer may be 1 to 40% by weight, specifically 1 to 30% by weight, and more specifically 1 to 20% by weight. When the content of the α-olefin comonomer is less than 1% by weight, stiffness of the ethylene polymer is increased but impact resistance is decreased, thereby having a difficulty in use in a film, injection molding, compounding, sheet extrusion, blow molding, or the like which requires impact resistance, and when the content is more than 20% by weight, the impact resistance of the ethylene polymer is increased but the stiffness is decreased, thereby having a difficulty in application alone in a molded body such as a film, injection molding, compounding, sheet extrusion, or blow molding.

According to an exemplary embodiment of the present invention, the first ethylene polymer and the second ethylene polymer may have densities satisfying the following Equations 1 to 3:

$$0.87 \leq M_1 \leq 0.90 \quad \text{[Equation 1]}$$

$$0.90 \leq M_2 \leq 0.92 \quad \text{[Equation 2]}$$

$$0.015 \leq M_2 - M_1 \leq 0.030 \quad \text{[Equation 3]}$$

wherein $M_1$ is a density of the first ethylene polymer, $M_2$ is a density of the second ethylene polymer, the density is measured in accordance with ASTM D-792, the unit of the density is g/cc.

Within the ranges satisfying Equations 1 to 3, a molded body to be desired having a better heat sealing property at a low temperature, better impact strength at a low temperature, and better transparency may be provided.

In Equation 3, $M_2-M_1$ may be 0.015 to 0.030, specifically 0.017 to 0.029, and more specifically 0.018 to 0.027. When a density difference between the first ethylene polymer and the second ethylene polymer is less than 0.015, the effects of heat sealing property at a low temperature and impact strength at a low temperature are insignificant, and when the density difference is more than 0.030, a haze is increased so that transparency is not good.

According to an exemplary embodiment of the present invention, the ethylene polymer mixture in which the first ethylene polymer and the second ethylene polymer are mixed may have a density of 0.890 to 0.910 g/cc, as measured in accordance with ASTM D-792. Within the mixture density satisfying the range, a molded body having both excellent moldability and light transmittance may be provided.

According to an exemplary embodiment of the present invention, the ethylene polymer mixture in which the first ethylene polymer and the second ethylene polymer are mixed may have a molecular weight distribution of 2 to 3. When the molecular weight distribution is less than 2, a load to molding equipment is increased at the time of processing such as film molding or processability is deteriorated, for example, a thickness deviation of the molded article is increased, and when the molecular weight distribution is more than 3, mechanical physical properties such as impact resistance are deteriorated.

According to an exemplary embodiment of the present invention, the first ethylene polymer and the second ethylene polymer may provide a molded body as targeted, having a better heat sealing property at a low temperature, better impact strength at a low temperature, and better transparency, within the range of melt indexes both satisfying the following range. Specifically, the first ethylene polymer may have a melt index satisfying the following Equation 4 and the second ethylene polymer may have a melt index satisfying the following Equation 5:

$$0.2 \leq MI_1 \leq 0.9 \quad \text{[Equation 4]}$$

$$1 \leq MI_2 \leq 3 \quad \text{[Equation 5]}$$

wherein $MI_1$ is a melt index of the first ethylene polymer, $MI_2$ is a melt index of the second ethylene polymer, and the melt index is measured at 190° C. under 2.16 kg in accordance with ASTM D 1238 and the unit of the melt index is g/10 min.

In addition, the first ethylene polymer and the second ethylene polymer may have a melt index satisfying the following Equation 6:

$$1 \leq MI_2/MI_1 \leq 5 \quad \text{[Equation 6]}$$

wherein $MI_2$ is a melt index of the second ethylene polymer, $MI_1$ is a melt index of the first ethylene polymer, the melt index is measured at 190° C. under 2.16 kg in accordance with ASTM D 1238, and the unit of the melt index is g/10 min.

Within the range satisfying Equations 4 to 6, a molded body having a better heat sealing property at a low temperature, better impact strength at a low temperature, and better transparency may be provided.

In Equation 6, when $MI_2/MI_1$ is more than 5, which is out of the above range, the molecular weight distribution range of 2 to 3 may not be satisfied, causing mechanical properties such as impact resistance to be deteriorated, and when $MI_2/MI_1$ is less than 1, the mechanical properties such as impact resistance are also deteriorated.

According to an exemplary embodiment of the present invention, in order to satisfy both Equations 1 to 6 and the molecular weight distributions, the first ethylene polymer and the second ethylene polymer may be those polymerized in the presence of a metallocene catalyst.

More specifically, for example, the first ethylene polymer may be obtained by polymerizing ethylene and a C3-C18 α-olefin comonomer in the presence of a first metallocene catalyst. The second ethylene polymer may be obtained by polymerizing ethylene and a C3-C18 α-olefin comonomer in the presence of a second metallocene catalyst.

The first metallocene catalyst may be a mixture of complexes represented by the following Chemical Formula 1 and 2, and the second metallocene catalyst may be a complex represented by the following Chemical Formula 3:

[Chemical Formula 1]

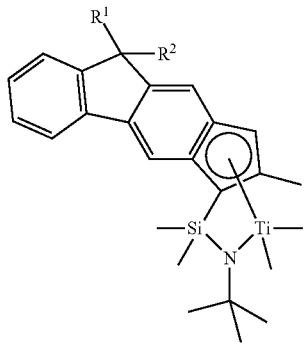

[Chemical Formula 2]

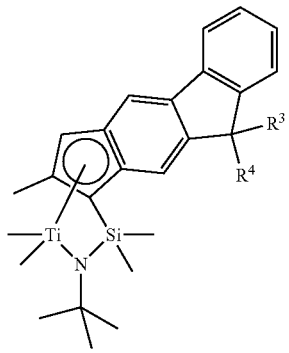

[Chemical Formula 3]

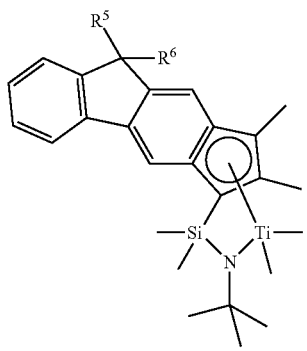

wherein $R^1$, $R^2$, $R^3$, $R^4$, $R^5$ and $R^6$ are $C_1$-$C_{30}$ alkyl independent of each other.

The "alkyl" refers to a monovalent straight-chain or branched-chain saturated hydrocarbon radical, composed of only carbon and hydrogen atoms, and an example of the alkyl radical includes methyl, ethyl, n-propyl, isopropyl, n-butyl, isobutyl, sec-butyl, tert-butyl, n-pentyl, neopentyl, n-hexyl, n-octyl, n-decyl, n-dodecyl, n-tetradecyl, n-hexadecyl, n-pentadecyl, nonyl, and the like but not limited thereto.

More specifically, the alkyl in Chemical Formula 1 to 3 may be $C_1$-$C_{20}$ alkyl. More specifically, the alkyl may be $C_1$-$C_{15}$ alkyl.

According to an exemplary embodiment of the present invention, the first metallocene catalyst may be a mixture in which the complex represented by Chemical Formula 1 and the complex represented by Chemical Formula 2 are mixed at a weight ratio of 3:7 to 7:3. More specifically, the first metallocene catalyst may be a mixture in which the two complexes are mixed in the same amount.

According to an exemplary embodiment of the present invention, when the first ethylene polymer and the second ethylene polymer are prepared, a cocatalyst, a solvent, and the like may be further used, in addition to the metallocene catalyst.

The cocatalyst is not limited as long as it is commonly used in the art; however, specifically for example, the cocatalyst may be any one or a mixture of two or more selected from the group consisting of boron compounds and aluminum compounds.

More specifically, the boron compound may be selected from compounds represented by the following Chemical Formula 4, 5, or 6, as described in U.S. Pat. No. 5,198,401:

$B(R^7)_3$      [Chemical Formula 4]

$[R8][B(R7)_4]^-$      [Chemical Formula 5]

$[(R9)_qZH]^+[B(R7)_4]^-$      [Chemical Formula 6]

wherein B is a boron atom, $R^7$ is phenyl in which the phenyl may be further substituted by 3 to 5 substituents selected from the group consisting of fluoro, (C1-C20)alkyl unsubstituted or substituted by fluoro, and (C1-C20)alkoxy unsubstituted or substituted by fluoro; $R^9$ is a (C5-C7) aromatic radical, a (C1-C20)alkyl(C6-C20)aryl radical, or a (C6-C20)aryl(C1-C20)alkyl radical, for example, a triphenylmethylium radical; Z is a nitrogen or phosphorus atom; $R^9$ is (C1-C50)alkyl radical or an anilinium radical substituted by two (C1-C20)alkyl together with nitrogen atom; and q is an integer of 2 or 3.

The term "alkyl" refers to a monovalent straight-chain or branched-chain saturated hydrocarbon radical consisting of only carbon and hydrogen atoms, and an example of the alkyl radical includes methyl, ethyl, propyl, isopropyl, butyl, isobutyl, t-butyl, pentyl, hexyl, octyl, nonyl, and the like, but not limited thereto.

The term "alkoxy" refers to an —O-alkyl radical, wherein the "alkyl" is as defined above.

The term "aryl" refers to an organic radical derived from an aromatic hydrocarbon by removal of one hydrogen, including a single or fused ring system containing appropriately 4 to 7 ring atoms, preferably 5 or 6 ring atoms in each ring, and even a form in which a plurality of aryls are linked by a single bond. A fused ring system may include an aliphatic ring such as saturated or partially saturated rings, and necessarily includes one or more aromatic rings. In addition, the aliphatic ring may contain nitrogen, oxygen, sulfur, carbonyl and the like in the ring. The specific example of the aryl radical includes phenyl, naphthyl, biphenyl, indenyl, fluorenyl, phenanthrenyl, anthracenyl, triphenylenyl, pyrenyl, cricenyl, naphthacenyl, 9,10-dihydroanthracenyl, and the like.

A preferred example of the boron-based cocatalyst may include tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, phenylbis(pentafluorophenyl)borane, tetrakis (pentafluorophenyl)borate, tetrakis(2,3,5,6-tetrafluorophenyl)borate, tetrakis(2,3,4,5-tetrafluorophenyl) borate, tetrakis(3,4,5-trifluorophenyl)borate, tetrakis(2,2,4-trifluorophenyl)borate, phenylbis(pentafluorophenyl)borate, or tetrakis(3,5-bistrifluoromethylphenyl)borate. In addition, certain combination examples thereof may include ferrocenium tetrakis(pentafluorophenyl)borate, 1,1'-dimethylferrocenium tetrakis(pentafluorophenyl)borate, tetrakis(pentafluorophenyl)borate, triphenylmethylium tetrakis (pentafluorophenyl)borate, triphenylmethyl tetrakis(3,5-bistrifluoromethylphenyl)borate, triethylammonium tetrakis (pentafluorophenyl)borate, tripropylammonium tetrakis (pentafluorophenyl)borate, tri(n-butyl)ammonium tetrakis (pentafluorophenyl)borate, tri(n-butyl)ammonium tetrakis (3,5-bistrifluoromethylphenyl)borate, N,N-dimethylanilinium tetrakis(pentafluorophenyl)borate, N,N-diethylanilinium tetrakis(pentafluorophenyl)borate, N,N-2,4,6-pentamethylanilinium tetrakis(pentafluorophenyl) borate, N,N-dimethylanilinium tetrakis(3,5-bistrifluoromethylphenyl)borate, diisopropylammonium tetrakis(pentafluorophenyl)borate, dicyclohexylammonium tetrakis(pentafluorophenyl)borate, triphenylphosphonium tetrakis(pentafluorophenyl)borate, tri(methylphenyl)phosphonium tetrakis(pentafluorophenyl)borate, or tri(dimethylphenyl)phosphonium tetrakis(pentafluorophenyl)borate, and among them, the most preferred are N,N-dimethylanilinium tetrakis(pentafluorophenyl)borate, triphenylmethylium tetrakis(pentafluorophenyl)borate, or tris(pentafluorophenyl)borane.

In addition, a mole ratio of a center metal M:a boron atom is preferably 1:0.1 to 50, and more preferably 1:0.5 to 15.

In addition, the aluminum compound may be an aluminoxane compound selected from Chemical Formula 7 or 8, an organoaluminum compound of Chemical Formula 9, or an organoaluminum hydrocarbyl oxide compound selected from Chemical Formula 10 or 11:

(—Al($R^{10}$)—O-)m      [Chemical Formula 7]

($R^{10}$)2Al—(—O($R^{10}$)-)p-($R^{10}$)2      [Chemical Formula 8]

($R^{11}$)rAl(E)3-r      [Chemical Formula 9]

(R12)$_2$AlOR13      [Chemical Formula 10]

$R^{12}$Al(O$R^{13}$)2      [Chemical Formula 11]

wherein $R^{10}$, $R^{11}$, and $R^{12}$ are a linear or non-linear (C1-C20)alkyl independent of each other, m and p are an integer of 5 to 20; E is a hydrogen atom or a halogen atom; r is an integer of 1 to 3; and $R^{13}$ is selected from (C1-C20) alkyl or (C6-C30)aryl.

The term "halogen" refers to a fluorine, chlorine, bromine, or iodine atom.

The term "alkyl" and "aryl" are as defined above.

A specific example which may be used as the aluminum compound may include methylaluminoxane, modified methylaluminoxane, and tetraisobutylaluminoxane as an aluminoxane compound; trialkylaluminum including trimethylaluminum, triethylaluminum, tripropylaluminum, triisobutylaluminum, trihexylaluminum, and trioctylaluminum; dialkyl aluminum chloride including dimethyl aluminum chloride, diethyl aluminum chloride, dipropyl aluminum chloride, diisobutyl aluminum chloride, and dihexyl aluminum chloride; alkyl aluminum dichloride including methyl aluminum dichloride, ethyl aluminum dichloride, propyl aluminum dichloride, isobutyl aluminum dichloride, and hexyl aluminum dichloride; dialkyl aluminum hydride including dimethyl aluminum hydride, diethyl aluminum hydride, dipropyl aluminum hydride, diisobutyl aluminum hydride, and dihexyl aluminum hydride.

According to an exemplary embodiment of the present invention, the aluminum compound may be one or a mixture of two or more selected from the group consisting of an alkylaluminoxane compound and trialkylaluminum, and more preferably one or a mixture of two or more selected from the group consisting of methylaluminoxane, modified methylaluminoxane, tetraisobutylaluminoxane, trimethylaluminum, triethylaluminum, trioctylaluminum, and triisobutylaluminum.

Meanwhile, the cocatalyst may serve as a scavenger removing impurities which act as a poison to the catalyst in the reactant.

According to an exemplary embodiment of the present invention, when the aluminum compound is used as the cocatalyst, a preferred range of a ratio between the center metal of the present invention Ti, and the cocatalyst may be 1:1 to 1:2,000, and more specifically 1:5 to 1:1,000 as a mole ratio of the center metal (Ti):the aluminum atom (Al).

According to an exemplary embodiment of the present invention, when the aluminum compounds and the boron compound are used as the cocatalyst at the same time, a preferred range of a ratio between the transition metal compound of the present invention and the cocatalyst may be 1:0.1 to 50:1 to 1,000, and more preferably 1:0.5 to 15:5 to 500 as a mole ratio of the center metal (Ti):the boron atom (B):the aluminum atom (Al).

The center metal Ti refers to Ti in the metallocene catalyst which is a single-active site catalyst.

When the ratio between the transition metal compound of the present invention and the cocatalyst is out of the above range, problems may arise in that the amount of the cocatalyst is relatively small so that activation of the transition metal compound is not completely achieved, and thus, the catalyst activity of the transition metal compound may not be sufficient, or the cocatalyst is used more than necessary to greatly increase production costs. Within the above range, excellent catalyst activity for preparing a copolymer of ethylene and an α-olefin is shown, and the range of the ratio is varied with the purity of the reaction.

More specifically, the cocatalyst may be any one or a mixture thereof selected from the group consisting of for example, triisobutylaluminum and triphenyl methylium tetrakis pentafluorophenyl borate.

According to an exemplary embodiment of the present invention, a method of preparing an ethylene polymer using the transition metal catalyst composition may proceed by bringing the transition metal catalyst, the cocatalyst, ethylene, and an α-olefin comonomer into contact with each other in the presence of a suitable organic solvent. Here, the transition metal catalyst and the cocatalyst components may be added to a reactor separately, or each component may be mixed previously and added to a reactor, and mixing conditions such as an addition order, temperature, or concentration are not particularly limited.

The solvent may be a C3-C20 hydrocarbon, and specifically, an example thereof may include any one or a mixture of two or more selected from the group consisting of butane, isobutane, pentane, hexane, heptane, octane, isooctane, nonane, decane, dodecane, cyclohexane, methylcyclohexane, benzene, toluene, xylene, and the like.

A content of the first metallocene catalyst may be 0.1 to 5 µmol/kg, based on 100 kg/h of the total solution flow rate of the solvent, ethylene, and the α-olefin comonomer.

A content of the second metallocene catalyst may be 0.5 to 10 µmol/kg, based on 100 kg/h of the total solution flow rate of the solvent, ethylene, and the α-olefin comonomer.

An ethylene polymer mixture in which the first ethylene polymer and the second ethylene polymer which are polymerized in the presence of the metallocene catalyst are mixed may satisfy the following Equation 7:

$$HS_1 + 10 \leq HS_2 \qquad \text{[Equation 7]}$$

wherein $HS_1$ is a heat sealing temperature of the ethylene polymer mixture, $HS_2$ is a heat sealing temperature of one ethylene polymer having the same density, melt index, and molecular weight distribution as $HS_1$, and the unit of the temperature is °C.

That is, the ethylene polymer mixture in which the first ethylene polymer and the second ethylene polymer of the present invention are mixed may have a heat sealing temperature lower by 10° C. or more than a homopolymer having the same density, melt index, and molecular weight distribution. In addition, the ethylene polymer mixture may maintain better heat sealing strength even at a low heat sealing temperature. More specifically, a lowest sealing temperature may be lower than a homopolymer by 10° C. or more at a hot-stack strength of 1.5 N/cm or more.

More specifically, according to an exemplary embodiment of the present invention, the ethylene polymer mixture may have a heat sealing temperature of 70 to 85° C., and a lowest sealing temperature of 50 to 75° C. at a hot-tack strength of 1.5 N/cm or more.

According to an exemplary embodiment of the present invention, the ethylene polymer mixture may be a mixture in which 30 to 60% by weight of the first ethylene polymer and 40 to 70% by weight of the second ethylene polymer are mixed. More specifically, the ethylene polymer mixture may be a mixture in which 40 to 50% by weight of the first ethylene polymer and 50 to 60% by weight of the second ethylene polymer are mixed.

According to another exemplary embodiment of the present invention, a molded article manufactured using the ethylene polymer mixture is provided. The molded article may be any one selected from a film, a sheet, and a food container, but not limited thereto.

The film may be molded by blowing or casting from which a single layer or multilayer film for packaging may be manufactured, and may be applied to uses such as a shrinkage film, a heavy weight packaging film, a frozen packaging film, an automatic packaging film, stretch wrap, a bag and the like.

More specifically, the film may be an unoriented film or an oriented film, and more specifically for example, may be manufactured by injection molding and extrusion or may be uniaxially oriented or biaxially oriented after injection molding and extrusion. The film may have a thickness of 10 to 250 µm, but not limited thereto.

In addition, by using the ethylene polymer mixture, the film has characteristics of having a very low heat sealing temperature, excellent heat sealing strength at a low temperature, and a low haze to be transparent. Specifically, the film may have a lowest sealing temperature of 85° C. or less and more specifically 70 to 85° C. at a heat-seal strength of 600 g or more in accordance with ASTM F 88, and a lowest sealing temperature of 75° C. or less and more specifically 50 to 75° C. at a hot-tack strength of 1.5 N/cm or more in accordance with ASTM F 1921. In addition, the film may have a falling dart impact strength of 1700 g or more and more specifically 1700 to 1800 g in accordance with ASTM D 1709 method A. In addition, the film may have a haze of 5% or less and more specifically 4% or less in accordance with ASTM D 1003.

According to an exemplary embodiment, the film according to the present invention may be included in a multilayer film for food packaging as at least one layer or more. The multilayer film for food packaging may further include a printing layer, an aluminum deposition layer, an oxygen barrier layer, an impact resistance reinforcing layer, or the like in addition to the film or sheet according to the present invention, but not limited thereto. Specifically, the oxygen barrier layer may be formed of ethylene vinyl alcohol (EVOH) or the like and the impact resistance reinforcing layer may be formed of polyamide (PA), polyester, or the like, but not limited thereto.

Next, a method of preparing the ethylene polymer mixture according to an exemplary embodiment of the present invention will be described in detail.

The ethylene polymer of the present invention may be formed of solution polymerization, and a first reactor for preparing the first ethylene polymer and a second reactor for preparing the second ethylene polymer may exist separately. In addition, in the first reactor and the second reactor, at least two stages of polymerization may be performed separately from each other, and two or more reactors may be included.

The first reactor and the second reactor may be connected in series, so that the first ethylene polymer is prepared in the first reactor, the thus-prepared first ethylene polymer and an unreacted material are continuously transferred to the second reactor, ethylene, an α-olefin comonomer, a solvent, a catalyst, a cocatalyst, and the like are further added to the second reactor, and the second ethylene polymer is polymerized and mixed simultaneously with the first ethylene polymer.

Otherwise, the first reactor and the second reactor may be connected in parallel, so that the first ethylene polymer is prepared in the first reactor and the second ethylene polymer is prepared in the second reactor, and then the prepared first and second ethylene polymers are transferred to a separate mixer, in which the first ethylene polymer and the second ethylene polymer are mixed.

More specifically, an exemplary embodiment of the method of preparing the ethylene polymer mixture of the present invention may include:

polymerizing ethylene and a C3-C18 α-olefin comonomer in the presence of a first metallocene catalyst in a first reactor to prepare a first ethylene polymer; and polymerizing ethylene and a C3-C18 α-olefin comonomer in the presence of a second metallocene catalyst in a second reactor to prepare a second ethylene polymer, wherein the first ethylene polymer and the second ethylene polymer may have densities satisfying the following Equations 1 to 3 and the ethylene polymer mixture may have a molecular weight distribution of 2 to 3:

$$0.87 \leq M_1 \leq 0.90 \qquad \text{[Equation 1]}$$

$$0.90 \leq M_2 \leq 0.92 \qquad \text{[Equation 2]}$$

$$0.015 \leq M_2 - M_1 \leq 0.030 \qquad \text{[Equation 3]}$$

wherein $M_1$ is a density of the first ethylene polymer, $M_2$ is a density of the second ethylene polymer, the density is measured in accordance with ASTM D-792, and the unit of the density is g/cc.

According to an exemplary embodiment of the present invention, the first metallocene catalyst and the second metallocene catalyst are as described above, and in addition to that, a cocatalyst, a solvent, and the like may be further included.

According to an exemplary embodiment of the present invention, operation conditions of the first reactor and the second reactor may be a temperature of 80 to 210° C. and more specifically 80 to 150° C., and a pressure of 20 to 500 atm and more specifically 30 to 200 atm.

When the reaction temperature is less than 80° C., reactants are precipitated or dispersion is not performed well and the reaction does not occur so that it is difficult to produce a polymerized product, and when the reaction temperature is more than 210° C., it is impossible to prepare a polymer having a predetermined molecular weight. In addition, when the pressure is out of the above range also, it may be difficult to prepare a polymer having a required molecular weight.

In addition, the present invention has a technical feature in that when the first ethylene polymer and the second ethylene polymer are prepared in the polymerization step, different kinds of metallocene catalysts from each other are used and polymerization temperature and ethylene contents are different, thereby preparing ethylene polymers having different densities from each other and a density difference in the range satisfying Equation 3.

In addition, the present invention has a technical feature in that hydrogen is injected to control the molecular weight, thereby preparing the ethylene polymer having a narrow molecular weight distribution of 2 to 3.

According to an exemplary embodiment of the present invention, the first reactor and the second reactor may be arranged by serial connection or parallel connection.

According to an exemplary embodiment of the present invention, ethylene and the $C_3$-$C_{18}$ α-olefin comonomer added to the first reactor and the second reactor in the polymerization step undergo a process of being dissolved in a solvent before adding the reactors, and before mixing them with the solvent and dissolving them, the ethylene, the comonomer and the solvent may undergo a purification process to remove moisture, oxygen, carbon monoxide and other metal impurities which may be potentially poisonous to the catalyst. The materials used in the purification process may be a molecular sieve, activated aluminum, silica gel, or the like, as known in the art.

In addition, before being added, the raw materials added to the polymerization step may undergo a heat exchange process to be cooled or heated, thereby controlling the temperature in the reactor. Accordingly, temperature control of the reactor is an adiabatic reactor process without heat exchange by a reactor wall, and control of reaction heat may change the temperature of flows of the solvent and the monomer introduced to the reactor and control the temperature in the reactor.

In addition, the metallocene catalyst is supplied independently of other raw materials when added, and herein, it is preferred that the metallocene catalyst is prepared in the state of being previously mixed or dissolved in the solvent.

Hereinafter, the present invention will be described in more detail with reference to the Examples and Comparative Examples. However, the following Examples and Comparative Examples are only an example for describing the present invention in detail, and do not limit the present invention in any way.

Unless otherwise stated, all experiments of synthesizing ligands and catalysts were carried out using a standard Schlenk or glove box technology under a nitrogen atmosphere, and the organic solvent used in the reaction was refluxed under sodium metal and benzophenone to remove moisture and distilled immediately before use. The $^1$H-NMR analysis of the synthesized ligand and the catalyst was carried out using a Varian Mercury 300 MHz spectrometer at room temperature.

Methyl cyclohexane which is a polymerization solvent was used after being passed through tubes filled with a Q-5 catalyst (BASF), silica gel, and activated alumina in turn, and being bubbled with high-purity nitrogen to sufficiently remove moisture, oxygen, and other catalyst poisoning materials therefrom.

Hereinafter, the physical properties were measured as follows:

1) Density

Measured in accordance with ASTM D 792.

2) Melt Index

Measured at 190° C. under 2.16 kg in accordance with ASTM D 1238.

3) I10/I2

According to ASTM D 1238, a melt index at 190° C. under a load of 10 kg was defined as I10, a melt index at 190° C. under a load of 2.16 kg was defined as I2, and a ratio of the measured values was represented.

4) I21/I2

According to ASTM D 1238, a melt index at 190° C. under a load of 21.6 kg was defined as I21, a melt index at 190° C. under a load of 2.16 kg was defined as I2, and a ratio of the measured values was shown.

5) Temperature Rising Elution Fractionation (TREF)

Hardware and procedures used are as described in references such as Wild et al., Journal of Polymer Science, Poly. Phys. Ed., 20, 41 (1982), U.S. Pat. No. 4,798,081 issued to Hazlitt et al., and U.S. Pat. No. 5,089,321 issued to Chum et al.

More specifically, the measurement was performed using Crystaf-TREF equipment manufactured by PolymerChar, and as the solvent, 1,2,4-trichlorobenzene was used.

A measurement method was performed by carrying out dissolution, stabilization, crystallization, and elution subsequently, and a sample which was dissolved out during elution was analyzed.

Dissolution: a step in which 60 mg of a sample is dissolved in 20 ml of a solvent. It is necessary to maintain the temperature at or above a temperature at which the sample is completely dissolved in 1,2,4-trichlorobenzene as the solvent, and the temperature was maintained at 160° C. for 60 minutes.

Stabilization: a step in which the polymer solution prepared in the dissolution step is maintained at a constant temperature. It is necessary to maintain the temperature at or above a temperature at which the polymer is not precipitated, and the temperature was maintained at 100° C. for 45 minutes.

Crystallization: a step in which the temperature of the polymer solution is lowered at a constant rate and the polymer in the solution is separated and crystallized in accordance with density. The separation crystallization proceeded by changing the temperature from 100° C. to 35° C. at a rate of 0.5° C./min.

Since a soluble fraction was not crystallized after the crystallization step, a portion which was not precipitated was measured, and an amount of the sample of 0.5 ml/min which was eluted out by a pump flow was measured with an IR detector while the sample was maintained at a temperature of 35° C. for 10 minutes.

Elution: a step in which, the polymer separated and crystallized according to the density in a crystallization stage is heated at a constant rate and a density distribution in the sample is analyzed. The temperature was changed from 35° C. to 120° C. at a rate of 1° C./min and an amount of the sample which was eluted out by a pump flow at 0.5 ml/min for each temperature was measured with an IR detector.

6) Analysis of Content of Comonomer

Measured using a $^{13}$C-nuclear magnetic resonance (NMR) spectroscopy.

7) Measurement of Molecular Weight and Molecular Weight Distribution

Measured using gel permeation chromatography (GPC).

As the solvent, 1,2,4-trichloro benzene was used. The measurement was performed at 160° C., and separation and analysis were performed with three PL gel columns connected in series. As a standard for calculating a relative molecular weight, a polystyrene standard having a molecular weight of 580 to 6,870,000 and a Mark Houwink constant (K,α) of Polyethylene were used.

8) Measurement of Falling Dart Impact Strength of Film

Measured according to ASTM D 1709 method A.

The results are shown in FIG. 1.

9) Measurement of Hot-Tack of Film

Measurement was performed in accordance with ASTM F1921, under the conditions of a film width of 25 mm, a seal pressure of 0.3 N/mm$^2$, and a sealing time of 1 sec.

Figure 2:
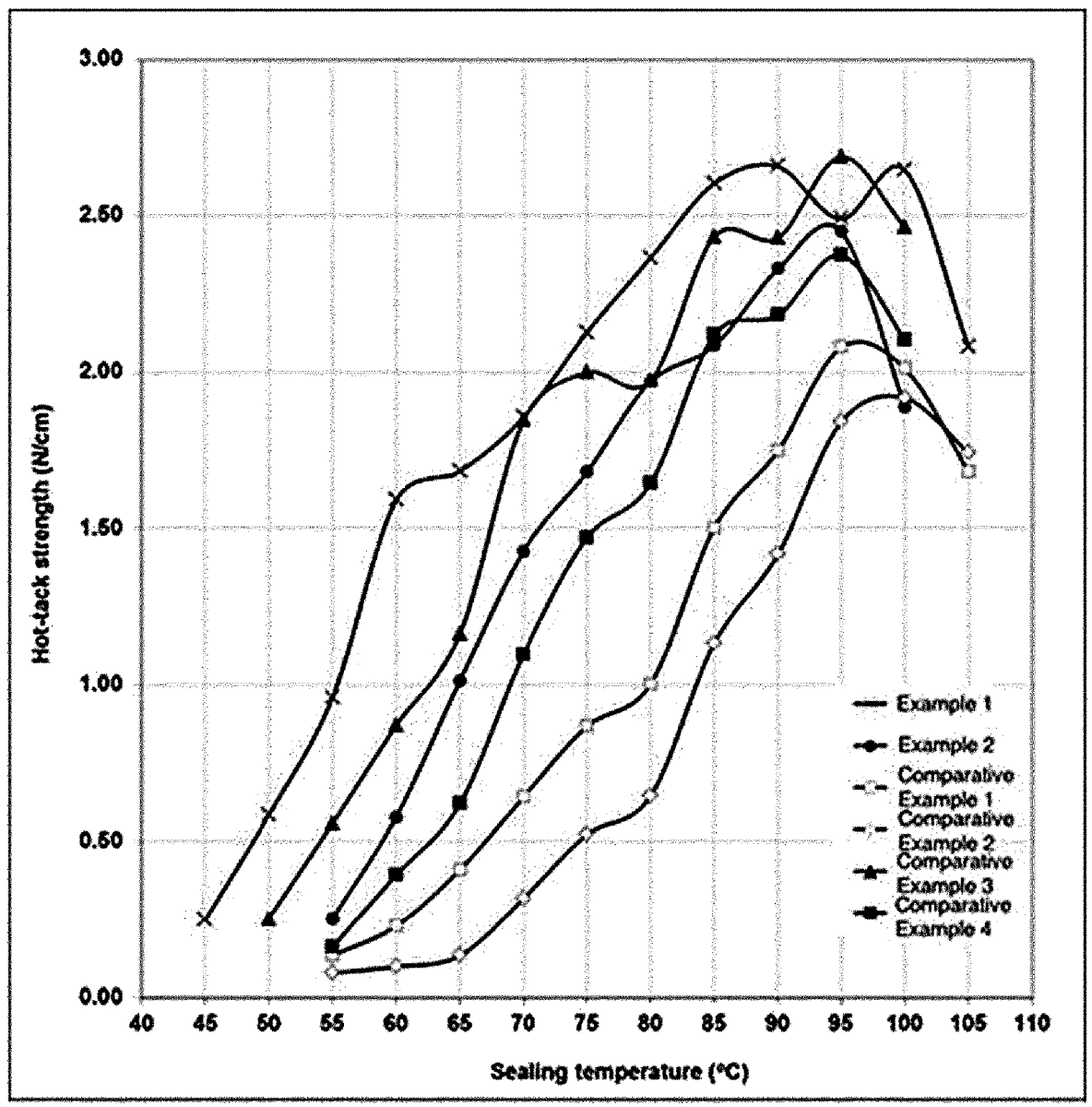
FIG. 2 is a graph of hot-tack measurement of films of the Examples and the Comparative Examples of the present invention.

The results are shown in FIG. 2.

10) Measurement of Heat-Seal Temperature of Film

Measurement was performed in accordance with ASTM F 88, and after heat-sealing under the conditions of a film width of 25 mm, a seal pressure of 2 bar, and a sealing time of 1 sec, strength at breakage of an adhesive surface was measured using UTM equipment with a tensile speed of 250 mm/min.

Figure 3:
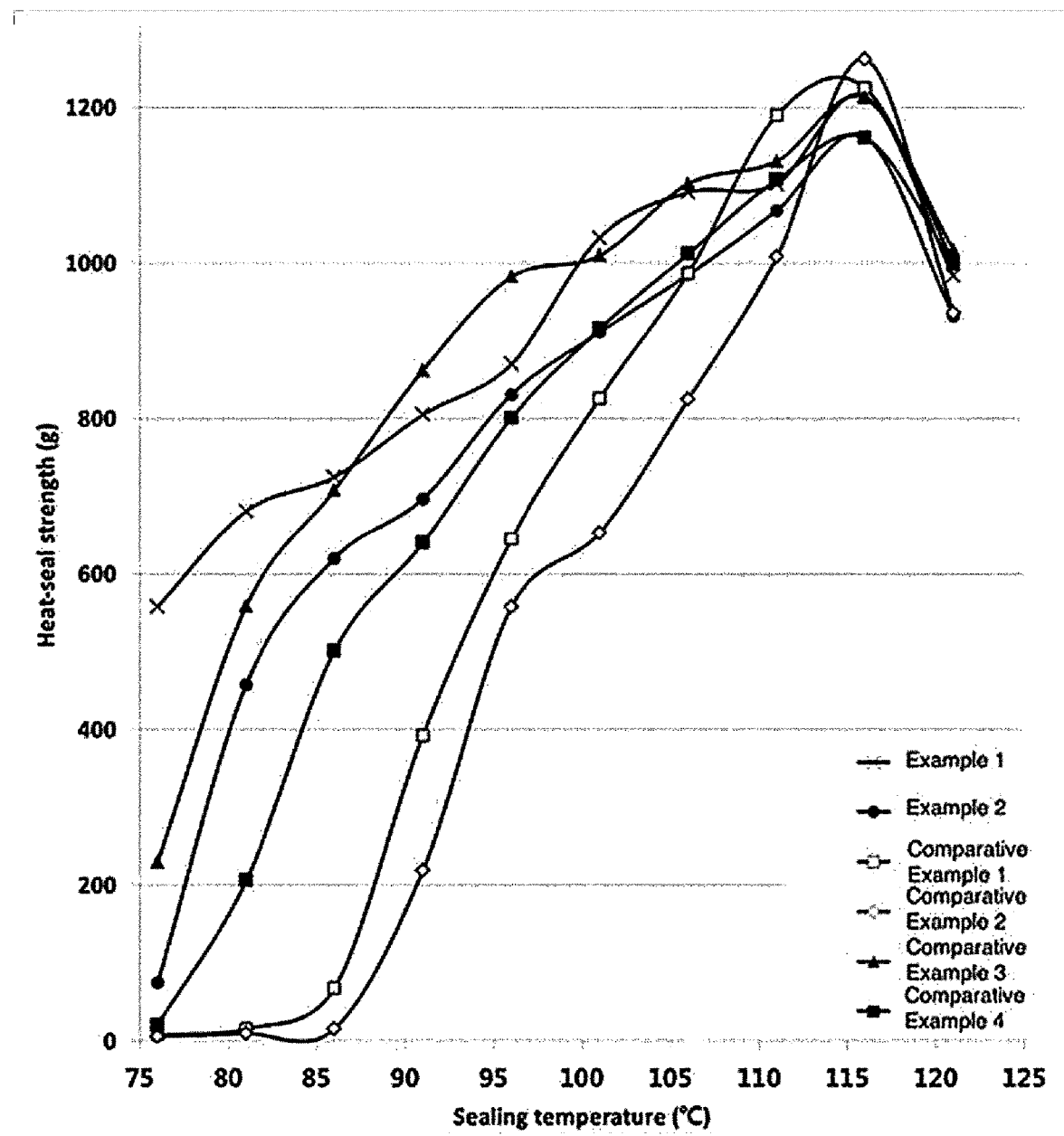
FIG. 3 is a graph of measurement of heat-seal properties of films of the Examples and the Comparative Examples of the present invention.

The results are shown in FIG. 3.

11) Measurement of Haze of Film

Hazes of single layer blown films having a thickness of 40 μm, prepared in Examples and Comparative Examples were measured, using a haze meter in accordance with ASTM D 1003.

PREPARATION EXAMPLE 1

Preparation of Complex 1 and Complex 2

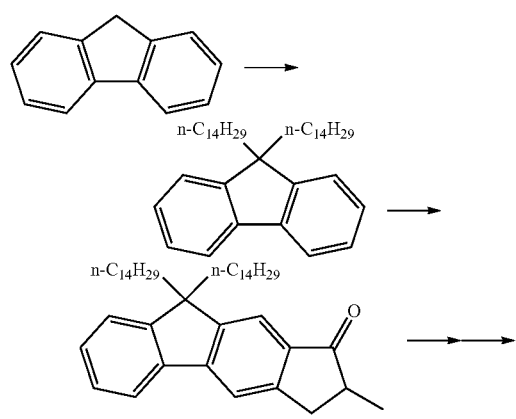

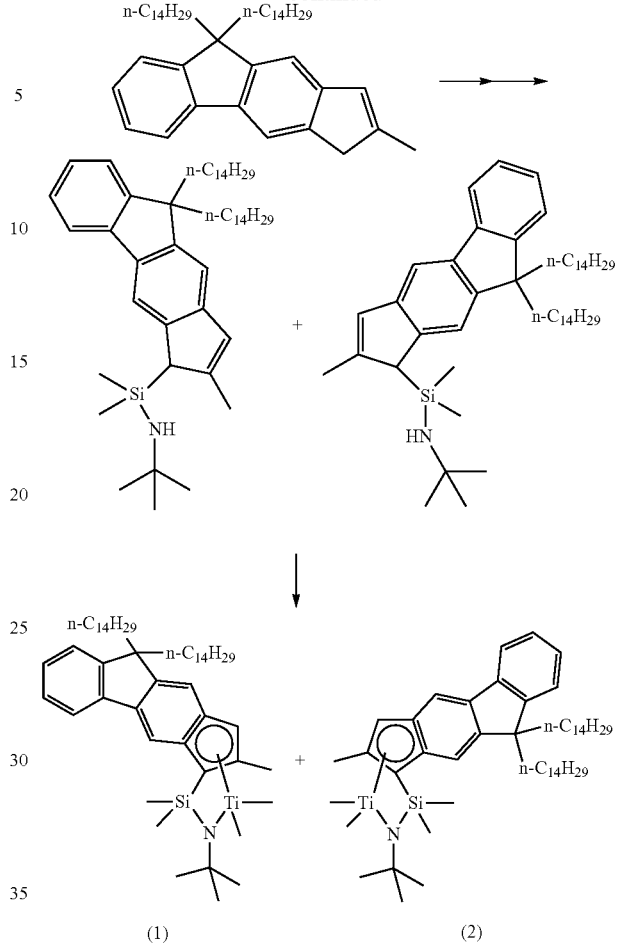

Preparation of 9,9-ditetradecyl-9H-fluorene

To a 2000 mL round flask, 9H-fluorene (15 g, 90.24 mmol) and potassium t-butoxide (21.2 g, 198.5 mmol) were added and 300 mL of DMSO was slowly injected. 1-bromotetradecane (54 g, 198.5 mmol) was placed in a dropping funnel and slowly added dropwise, while the reactor temperature was maintained at 10° C. or less under a nitrogen atmosphere. After stirring at room temperature for 24 hours, 500 mL of distilled water was added to complete the reaction, the product was extracted with n-hexane and collected, the organic layer was dried with magnesium sulfate, volatile material was removed, and purification was performed with n-hexane using silica gel chromatography column to obtain 42.0 g of 9,9-ditetradecyl-9H-fluorene (yield: 83.26%) as a white solid content.

$^1$H-NMR (500 MHz, CDCl$_3$, ppm): δ=0.616-0.634(m, 4H), 0.881-0.909(m, 6H), 1.051-1.323(m, 44H), 1.951-1.984(t, 4H), 7.292-7.355(m, 6H), 7.708-7.722(d, 2H)

Preparation of 2-methyl-9,9-ditetradecyl-2,3-dihydrocyclopenta[b]fluoren-1(9H)-one To a 500 ml round flask, 9,9-ditetradecyl-9H-fluorene (30 g, 53.7 mmol) and 2-bromo-2-methylpropanoyl bromide (12.7 g, 55.3 mmol) were added, and then 300 mL of carbon disulfide was added and dissolved therein, and the reactor was cooled with ice water. Aluminum trichloride (15.7 g, 118.1 mmol) was slowly injected in 10 portions over 2 hours under a nitrogen atmosphere. Then, the reactants were stirred at room temperature for 8 hours, 100 mL of distilled water was added thereto to complete the reaction, and the product was washed three times with 500 mL of distilled water. The organic layer was dried with magnesium sulfate, and volatile material was removed and dried to obtain 30.0 g of 2-methyl-9,9-ditetradecyl-2,3-dihydrocyclopenta[b]fluoren-1(9H)-one (yield: 89.1%) in the form of a highly viscous oil.

$^1$H-NMR (500 MHz, CDCl$_3$, ppm): δ=0.590(m, 4H), 0.867-0.895(m, 6H), 1.024-1.295(m, 44H), 1.367-1.382(d, 3H), 1.963-2.204(t, 4H), 2.792-2.826(d, 2H), 3.448-3.500 (m, 1H), 7.372-7.400(m, 3H), 7.726-7.780(m, 3H)

Preparation of 2-methyl-9,9-ditetradecyl-3,9-dihydrocyclopenta[b]fluorene

In a 500 mL round flask, 2-methyl-9,9-ditetradecyl-2,3-dihydrocyclopenta[b]fluoren-1(9H)-one (20 g, 31.9 mmol) was dissolved in 150 mL of THF and 150 mL of ethanol and stirred. Sodium borohydride (NaBH$_4$) (1.8 g, 47.8 mmol) was added in five portions to the reactants and stirred for 12 hours. All the solvent was removed, and then the reactants were dissolved in ethyl acetate and washed three times with water. The organic layer was dried with magnesium sulfate and volatile material was removed. The dried reactants were dissolved in 150 mL of toluene and added to a 2500 mL round flask, para toluene sulfonic acid (0.08 g) was added, Dean-Stark was installed, and water was completely removed by reflux. The reactants were cooled to room temperature, an aqueous ammonium chloride solution (100 mL) and 200 mL of diethyl ether were injected, and the organic layer was separated, the residue was extracted with diethyl ether, the collected organic layer was dried with magnesium sulfate, the volatile material was removed, and then a silica gel chromatography column was used to obtain 15.3 g of 2-methyl-9,9-ditetradecyl-3,9-dihydrocyclopenta[b]fluorene (yield: 78.5%).

$^1$H-NMR (500 MHz, CDCl$_3$, ppm): δ=0.649-0.665(m, 4H), 0.891-0.918(m, 6H), 1.059-1.319(m, 44H), 1.953-1.986(t, 4H), 2.206(s, 3H), 3.378(s, 2H), 6.562(s, 1H), 7.237-7.332(m, 4H), 7.663-7.678(d, 1H), 7.710(s, 1H)

Preparation of N-tert-butyl-1-(9,9-ditetradecyl-2-methyl-3,9-dihydrocyclopenta[b]fluoren-3-yl)-1,1-dimethylsilanamine and N-tert-butyl-1-(9,9-ditetradecyl-2-methyl-1,9-dihydrocyclopenta[b]fluoren-1-yl)-1,1-dimethylsilanamine In a 250 mL round flask, 2-methyl-9,9-ditetradecyl-3,9-dihydrocyclopenta[b]fluorene (4.9 g, 8.0 mmol) was dissolved in 100 mL of anhydrous diethyl ether, the temperature was lowered to −78° C., n-butyl lithium (1.6 M hexane solution, 5.5 mL) was slowly added, and the reactants were stirred at room temperature for 12 hours. The volatile material was removed under vacuum, 100 mL of n-hexane was added, the reactor temperature was lowered to −78° C., and dichlorodimethylsilane (2.9 g) was added. The temperature was raised again to room temperature, stirring was performed for 24 hours, and the salt was filtered and removed. Then, the volatile material was removed under vacuum. The product was added again to the 250 mL round flask, dissolved in 100 mL of diethyl ether, and the temperature was lowered to −78° C., and tert-butyl amine (1.8 g, 24.1 mmol) was added thereto. The temperature was raised to room temperature, stirring was performed for 12 hours, and the volatile material was completely removed under vacuum. Then, 200 mL of n-hexane was added and the reactants were dissolved therein, and the salt was filtered and removed. When the solvent was removed, 5.5 g of a highly viscous mixture of N-tert-butyl-1-(9,9-ditetradecyl-2-methyl-3,9-dihydrocyclopenta[b]fluoren-3-yl)-1,1-dimethylsilanamine and N-tert-butyl-1-(9,9-ditetradecyl-2-methyl-1,9-dihydrocyclopenta[b]fluoren-1-yl)-1,1-dimethylsilanamine (ratio=~1:1) (yield: 92.7%) was obtained.

$^1$H-NMR (500 MHz, C$_6$D$_6$, ppm): δ=0.145(s, 3H), 0.183-0.204(d, 6H), 0.290(s, 3H), 0.552(s, 1H), 0.603(s, 1H), 0.998-1.370(m, 126H), 2.228-2.301(m, 14H), 3.408-3.435 (d, 2H), 6.749-6.760(d, 2H), 7.353-7.461(m, 6H), 7.546-8.073(m, 6H)

Preparation of (t-butylamido)dimethyl(9,9-ditetradecyl-2-methyl-3,9-dihydrocyclopenta[b]fluoren-3-yl)silane titanium (IV) dimethyl (Complex 1) and (t-butylamido)dimethyl(9,9-ditetradecyl-2-methyl-1,9-dihydrocyclopenta[b]fluoren-1-yl)silane titanium (IV) dimethyl (Complex 2)

In a 250 mL round flask, a mixture of N-tert-butyl-1-(9,9-ditetradecyl-2-methyl-3,9-dihydrocyclopenta[b]fluoren-3-yl)-1,1-dimethylsilanamine and N-tert-butyl-1-(9,9-ditetradecyl-2-methyl-1,9-dihydrocyclopenta[b]fluoren-1-yl)-1,1-dimethylsilanamine (ratio=~1:1) (5.0 g, 6.8 mmol) was dissolved in 100 mL of diethyl ether, the temperature was lowered to −78° C., and then methyl lithium (a 1.5 M diethyl ether solution, 18.5 mL) was slowly injected. The temperature was raised to room temperature, stirring was performed for 12 hours, and a lithium salt was made. Then, in a dry box, TiCl$_4$ (16.75 mmol) and 50 mL of anhydrous n-hexane were added to the 250 mL round flask, the temperature was lowered again to −78° C., and the previously prepared lithium salt was slowly added. The temperature was raised again to room temperature, stirring was performed for 4 hours, the solvent was removed by vacuum, the residue was dissolved in N-hexane and filtered, and a filtrate was extracted. n-hexane was removed again by vacuum and 5.2 g of a solid mixture of Complex 1 and Complex 2 (a ratio of almost 1:1) was obtained.

$^1$H-NMR (500 MHz, C$_6$D$_6$, ppm): δ=0.093-0.104(d, 6H), 0.630-0.647(d, 6H), 0.856-1.392(m, 120H), 1.609-1.643(d, 18H), 2.095-2.214(m, 14H), 7.023-7.041(d, 2H), 7.305-8.097(m, 12H)

PREPARATION EXAMPLE 2

Preparation of Complex 3

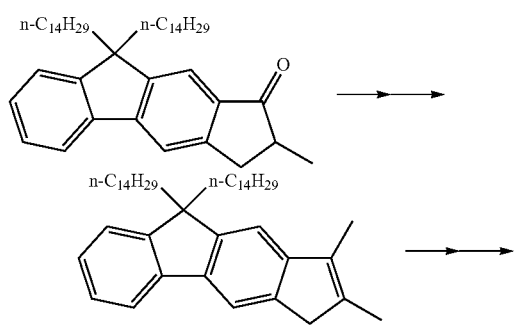

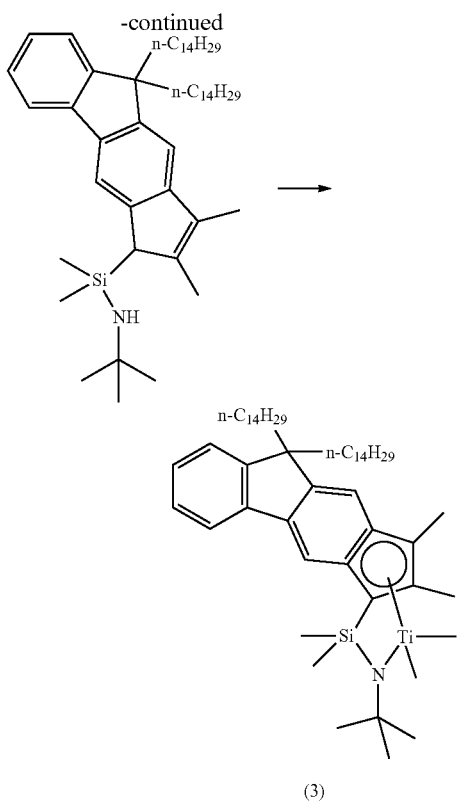

Preparation of 1,2-dimethyl-9,9-ditetradecyl-3,9-dihydrocyclopenta[b]fluorene In a 2,000 mL round flask, 2-methyl-9,9-ditetradecyl-3,9-dihydrocyclopenta[b]fluoren-1(2H)-one (119.5 g, 190.6 mmol) was dissolved in 400 mL of toluene, the temperature was lowered to 0° C., 76 mL of 3M-methyl magnesium bromide (THF solution) was slowly injected, and the reactants were stirred at room temperature for 12 hours. The reactants were poured into a mixture of 200 mL of an aqueous 1N-HCl solution and 200 g of ice.

After stirring for 1 hour, extraction was performed with toluene, the organic layer was dried with magnesium sulfate, and then the volatile material was removed. The dried products were dissolved in 400 mL of toluene and added to a 1,000 mL round flask, para toluene sulfonic acid (0.2 g) was added, Dean-Stark was installed, and water was completely removed by reflux. The products were cooled to room temperature, an aqueous ammonium chloride solution (150 mL) and 200 mL of diethyl ether were injected, and the organic layer was separated, the residue was extracted with diethyl ether, the collected organic layer was dried with magnesium sulfate, the volatile material was removed, and then a silica gel chromatography column was used to obtain 95.5 g of 1,2-dimethyl-9,9-ditetradecyl-3,9-dihydrocyclopenta[b]fluorene (yield: 80.2%).

$^1$H-NMR (500 MHz, CDCl$_3$, ppm): δ=1

Preparation of N-tert-butyl-1-(1,2-dimethyl-9,9-ditetradecyl-3,9-dihydrocyclopenta[b]fluoren-3-yl)-1,1-dimethylsilanamine In a 500 mL round flask, 1,2-dimethyl-9,9-ditetradecyl-3,9-dihydrocyclopenta[b]fluorene (36.0 g, 57.6 mmol) was dissolved in 300 mL of diethyl ether, the temperature was lowered to −78° C., n-butyl lithium (2.5 M hexane solution, 25.4 mL) was slowly added, and the reactants were stirred at room temperature for 12 hours. The volatile material was removed under vacuum, 350 mL of n-hexane was added, the reactor temperature was lowered to −78° C., and dichlorodimethylsilane (23 g) was added. The temperature was raised again to room temperature, stirring was performed for 24 hours, and the salt was filtered and removed. Then, the volatile material was removed under vacuum. The product was added again to the 500 mL round flask, dissolved in 320 mL of diethyl ether, and the temperature was lowered to −78° C., and tert-butyl amine (10.5 g, 144.0 mmol) was added thereto. The temperature was raised to room temperature, stirring was performed for 12 hours, and the volatile material was completely removed under vacuum. Then, 200 mL of toluene was added and the reactant was dissolved therein, and the salt was filtered and removed. When the solvent was removed, 37.10 g of viscous N-tert-butyl-1-(1,2-dimethyl-9,9-ditetradecyl-3,9-dihydrocyclopenta[b]fluoren-3-yl)-1,1-dimethylsilanamine (yield: 85.3%) was obtained.

$^1$H-NMR (500 MHz, C$_6$D$_6$, ppm): δ=0.124(s, 3H), 0.215 (s, 3H), 0.546(s, 1H), 1.000-1.371(m, 63H), 2.169(d, 6H), 2.274(m, 4H), 3.406(s, 1H), 7.343-7.477(m, 3H), 7.595(s, 1H), 7.913(d, 1H), 8.098(s, 1H)

Preparation of (t-butylamido)-1,1-dimethyl(1,2-dimethyl-9,9-ditetradecyl-3,9-dihydrocyclopenta[b]fluoren-3-yl)silane titanium (IV) dimethyl (Complex 3)

250 ml of N-tert-butyl-1-(1,2-dimethyl-9,9-ditetradecyl-3,9-dihydrocyclopenta[b]fluoren-3-yl)-1,1-dimethylsilanamine (20.9 g, 27.7 mmol) was dissolved in 200 mL of diethylether, the temperature was lowered to −78° C., and then methyl lithium (1.5 M diethyl ether solution, 75.76 mL) was slowly injected. The temperature was raised to room temperature, stirring was performed for 12 hours and a lithium salt was made. Then, in a dry box, TiCl$_4$ (5.26 g, 27.7 mmol) and 150 mL of anhydrous n-hexane were added to a 500 mL round flask, the temperature was lowered again to −78° C., and the previously prepared lithium salt was slowly added. The temperature was raised again to room temperature, stirring was performed for 4 hours, the solvent was removed by vacuum, the residue was dissolved again in toluene, and the insoluble portion was filtered and removed. Toluene was removed again by vacuum to obtain 17.8 g of a solid content of Complex 3.

$^1$H-NMR (500 MHz, C$_6$D$_6$, ppm): δ=−0.081(s, 3H), 0.205 (s, 3H), 0.516(s, 3H), 0.622(s, 3H), 0.724(s, 3H), 0.849-1.30 (m, 48H), 1.442(s, 9H), 1.919(s, 3H), 2.057(m, 4H), 2.278(s, 3H), 7.07-7.22(m, 3H), 7.518-7.533(d, 1H), 7.633(s, 1H), 7.970(s, 1H).

EXAMPLE 1

As a single active site catalyst of the first reactor, that is, the metallocene catalyst, the catalyst synthesized in Preparation Example 1 was used, and in the second reactor, the metallocene catalyst synthesized in Preparation Example 2 was used.

The first reactor and the second reactor were connected in series, and in the first reactor, the first ethylene polymer was prepared and the prepared first ethylene polymer and unreacted reactants were transferred to the second reactor, and in the second reactor, the monomer, the solvent, the catalyst, and the cocatalyst for preparing the second ethylene polymer were further added and the second ethylene polymer was continuously polymerized, and at the same time, the ethylene polymer mixture in which the first ethylene polymer and the second ethylene polymer were mixed was prepared.

The amounts of the catalysts used are as shown in Tables 1 and 2. Ti represents a single active site catalyst, Al represents the cocatalyst triisobutylaluminum, and B is the reaction catalyst activity cocatalyst such as triphenylmethylium tetrakis pentafluorophenylborate and the like, respectively. Each of the catalysts was dissolved in xylene at concentrations of 0.2 g/l, 2.4 g/l, and 0.5 g/l, respectively, and injected. An ethylene addition ratio was controlled and added for each stage of the reactor, and, 1-octene was used as the comonomer to perform synthesis. However, the amount of ethylene to be added to the second reactor is determined considering unreacted ethylene transferred to the second reactor to adjust polymer density and molecular weight when the conversion rate is low. The conversion rate of each reactor may be assumed by the reaction condition and the temperature gradient in the reactor when polymerization was carried out with one polymer under each reaction condition or by directly measuring the amount of the unreacted ethylene. In order to produce the copolymer having the targeted MI in the first and second reactors, an appropriate amount of hydrogen was injected to control the molecular weight. In addition, the molecular weight in each of the reactors was controlled by a function of a reactor temperature and a 1-octene content in the case of the single active site catalyst, and the conditions are shown in the following Table 1.

EXAMPLE 2

The polymer was prepared in the same manner as in Example 1, except that the ratio of the polymer polymerized in Reactor 1 and Reactor 2 was adjusted, and also in order to adjust the density and the molecular weight of the polymer polymerized in each reactor, the amount of ethylene and the amount of 1-octene as the comonomers supplied to each reactor and the reactor temperature condition were varied like the conditions shown in Table 1.

COMPARATIVE EXAMPLE 1

A commercially available product, Affinity 1880G from DOW was used.

COMPARATIVE EXAMPLE 2

A commercially available product, Nexlene® NX021 from SABIC SK Nexlene Company (SSNC) was used.

COMPARATIVE EXAMPLE 3

The polymer was prepared in the same manner as in Example 1, except that the ratio of the polymer polymerized in Reactor 1 and Reactor 2 was adjusted, and also in order to adjust the density and the molecular weight of the polymer polymerized in each reactor, the amount of ethylene and the amount of 1-octene as the comonomers supplied to each reactor and the reactor temperature condition were varied like the conditions shown in Table 1.

COMPARATIVE EXAMPLE 4

The polymer was prepared in the same manner as in Example 1, except that the ratio of the polymer polymerized in Reactor 1 and Reactor 2 was adjusted, and also in order to adjust the density and the molecular weight of the polymer polymerized in each reactor, the amount of ethylene and the amount of 1-octene as the comonomers supplied to each reactor and the reactor temperature condition were varied like the conditions shown in Table 1.

The following Table 1 shows synthesis conditions of Examples 1 and 2 and Comparative Examples 3 and 4.

TABLE 1

| Classification | | Example 1 | Example 2 | Comparative Example 3 | Comparative Example 4 |
|---|---|---|---|---|---|
| Total solution flow rate (kg/h) | Reactor 1 | 126.7 | 157 | 126.5 | 157 |
| | Reactor 2 | 98.5 | 66 | 98.5 | 66 |
| Ethylene addition ratio for each reactor (Mass ratio) | | 4.4:5.6 | 5.8:4.2 | 4.4:5.6 | 5.8:4.2 |
| Addition ratio between 1-octetne and ethylene (1-octene/ethylene) (Mass ratio) | Reactor 1 | 0.74 | 0.63 | 0.78 | 0.63 |
| | Reactor 2 | 0.23 | 0.26 | 0.18 | 0.26 |
| Ti addition amount (μmol/kg) | Reactor 1 | 2.8 | 3.1 | 2.9 | 2.5 |
| | Reactor 2 | 7.5 | 7.6 | 7.7 | 7.9 |
| Al/Ti ratio (mole ratio) | | 15 | 15 | 15 | 15 |
| B/Ti ratio (mole ratio) | | 3 | 3 | 3 | 3 |
| Hydrogen addition amount (PPM) | Reactor 1 | 7.2 | 8 | 7.5 | 6.7 |
| | Reactor 2 | 6.2 | 6.5 | 6 | 7 |
| Reaction temperature (° C.) | Reactor 1 | 117 | 118 | 118 | 116 |
| | Reactor 2 | 160 | 161 | 160 | 159 |

In the above Table 1, total solution flow rate: solvent+ethylene+octene flow rate (kg/hr), ethylene addition ratio is a mass ratio of Reactor 1:Reactor 2, Ti: refers to Ti in a single active site catalyst, Al: refers to Al in cocatalyst triisobutylaluminum, B: refers to B in cocatalyst triphenylmethylium tetrakis pentafluorophenylborate, and Al/Ti and B/Ti refer to a ratio between elements.

The physical properties of the polymers prepared by polymerization as in Table 1 are shown in the following Table 2.

TABLE 2

| | unit | Example 1 | Example 2 | Comparative Example 1 | Comparative Example 2 | Comparative Example 3 | Comparative Example 4 |
|---|---|---|---|---|---|---|---|
| Melt index | g/10 min | 1.0 | 1.0 | 1.0 | 1.0 | 1.0 | 1.0 |
| Density | g/cm³ | 0.901 | 0.901 | 0.902 | 0.902 | 0.903 | 0.901 |
| I21/I2 | | 30.1 | 28.2 | — | 29.8 | 32.2 | 38.1 |
| I10/I2 | | 8.6 | 8.2 | — | 8.5 | 8.9 | 10.0 |
| First ethylene polymer Density | g/cc | 0.886 | 0.893 | — | 0.897 | 0.885 | 0.894 |
| First ethylene polymer MI | g/10 min | 0.74 | 0.65 | — | 0.3 | 0.9 | 0.15 |
| First ethylene polymer Ratio | % | 45 | 55 | — | 45 | 45 | 55 |
| Second ethylene polymer Ratio | % | 55 | 45 | — | 55 | 55 | 45 |
| Second ethylene polymer Density | g/cc | 0.913 | 0.911 | — | 0.906 | 0.918 | 0.910 |
| Second ethylene polymer MI | g/10 min | 1.3 | 1.7 | — | 2.7 | 1.1 | 10.2 |
| Density gap (second ethylene polymer-first ethylene polymer) | g/cc | 0.027 | 0.018 | — | 0.009 | 0.033 | 0.016 |
| MI ratio (second ethylene polymer/first ethylene polymer) | g/10 min | 1.7 | 2.6 | — | 8.9 | 1.2 | 67.7 |
| α-olefin comonomer content | % by weight | 18.6 | 18.1 | 16.1 | 16.5 | 16.5 | 17.4 |
| Number average molecular weight Mn | | 47,700 | 47,800 | 49,100 | 43,000 | 48,400 | 32,100 |
| Weight average molecular weight Mw | | 102,100 | 108,500 | 99,300 | 106,900 | 96,800 | 98,100 |
| z average molecular weight Mz | | 181,600 | 209,700 | 182,400 | 236,900 | 168,900 | 287,100 |
| Molecular weight distribution index MWD | | 2.1 | 2.3 | 2.0 | 2.5 | 2.0 | 3.1 |

As seen from Table 2, it was confirmed that Examples 1 and 2 according to the present invention have a density difference between the two ethylene polymers in a range of 0.015 to 0.030, and a molecular weight distribution in a range of 2 to 3. It was confirmed that Comparative Example 1 was a homopolymer, Comparative Example 2 had a density difference between the two polymers of 0.009 which is very small, and Comparative Example 3 had a density difference between the two polymers of 0.033 which is high. It is recognized that Comparative Example 4 had a molecular weight distribution index of 3.1 which is high.

The following Table 3 shows results of measuring temperature rising elution fractionation (TREF). FIG. 1 is a graph depending on TREF.

TABLE 3

| Sample name | Peak temperature (° C.) | Peak area (%) | Soluble fraction (%) |
|---|---|---|---|
| Example 1 | 57/80 | 24/52 | 24 |
| Example 2 | 64/77 | 49/40 | 11 |

TABLE 3-continued

| Sample name | Peak temperature (° C.) | Peak area (%) | Soluble fraction (%) |
|---|---|---|---|
| Comparative Example 1 | 75 | 94 | 6 |
| Comparative Example 2 | 71 | 96 | 4 |

TABLE 3-continued

| Sample name | Peak temperature (° C.) | Peak area (%) | Soluble fraction (%) |
|---|---|---|---|
| Comparative Example 3 | 57/86 | 21/53 | 26 |
| Comparative Example 4 | 64/77 | 48/41 | 11 |

As seen from Table 3, it was confirmed that Examples 1 and 2 of the present invention show bimodal peaks. The ethylene polymer mixture prepared in the Examples and the Comparative Examples was molded into a single layer blown film having a thickness of 40 μm using a Macci blown film line. A processing temperature was 160° C., a blow up ratio was 2.1:1 as a width direction:a length direction, and a film width was 600 mm. A die gap was 1.8 mm and a take-up speed was 12.1 m/min.

The physical properties of the thus-prepared films were measured, and are shown in the following Table 4. In addition, a hot-tack measurement graph of the films is shown in Table 2. In addition, a heat-seal measurement graph of the films is shown in Table 3.

TABLE 4

|  | Example 1 | Example 2 | Comparative Example 1 | Comparative Example 2 | Comparative Example 3 | Comparative Example 4 |
|---|---|---|---|---|---|---|
| A sealing temperature at a hot-tack strength of 1.5 N/cm (° C.) | 59 | 71 | 85 | 91 | 67 | 76 |
| Temperature at a heat-seal strength of 600 g (° C.) | 78 | 85 | 95 | 97 | 82 | 89 |
| Falling dart impact strength (g) | >1760 | >1760 | 1360 | 1460 | >1760 | 1160 |
| Haze (%) | 3.9 | 4.0 | 3.1 | 3.5 | 6.0 | 3.5 |

As seen from Table 4, in Example 1 and Example 2 according to the present invention, the films had a falling dart impact strength of 1700 g or more in accordance with ASTM D 1709 method A, which is higher than those of Comparative Examples 1 and 2, and a lowest sealing temperature of 75° C. or less at a hot-tack strength of 1.5 N/cm or more in accordance with ASTM F 1921, which is lower than those of Comparative Examples 1 and 2 by 10° C. or more. In addition, the lowest sealing temperatures of the Example 1 and Example 2 were 85° C. or less at a heat-seal strength of 600 g or more in accordance with ASTM F 88, which is lower than those of Comparative Examples 1 and 2 by 10° C. or more. In addition, the haze was 5% or less in accordance with ASTM D 1003, which is low. As seen from Comparative Example 3, it was confirmed that when a density difference between the two polymers was 0.033 which is high, the haze was rapidly increased to 6.0%.

As seen from Comparative Example 4, it was confirmed that when the molecular weight distribution was 3.1 which is high, the falling dart impact strength was greatly decreased showing that impact resistance was greatly decreased, and the lowest sealing temperature at a hot-tack strength of 1.5 N/cm or more and the lowest sealing temperature at a heat-seal strength of 600 g or more were also high.

The invention claimed is:

1. An ethylene polymer mixture comprising a first ethylene polymer and a second ethylene polymer having densities satisfying the following Equations 1 to 3, wherein the ethylene polymer mixture has a molecular weight distribution of 2 to 3 and a density of 0.890 to 0.910 g/cc in accordance with ASTM D-792:

$$0.87 \leq M_1 \leq 0.90 \quad \text{[Equation 1]}$$

$$0.90 \leq M_2 \leq 0.92 \quad \text{[Equation 2]}$$

$$0.015 \leq M_2 - M_1 \leq 0.030 \quad \text{[Equation 3]}$$

wherein $M_1$ is a density of a first ethylene polymer, $M_2$ is a density of a second ethylene polymer, the density is measured in accordance with ASTM D-792, and a unit of the density is g/cc.

2. The ethylene polymer mixture of claim 1, wherein the first ethylene polymer has a melt index satisfying the following Equation 4 and the second ethylene polymer has a melt index satisfying the following Equation 5:

$$0.2 \leq MI_1 \leq 0.9 \quad \text{[Equation 4]}$$

$$1 \leq MI_2 \leq 3 \quad \text{[Equation 5]}$$

wherein $MI_1$ is the melt index of the first ethylene polymer, $MI_2$ is the melt index of the second ethylene polymer, the melt index is measured at 190° C. under 2.16 kg in accordance with ASTM D 1238, and a unit of the melt index is g/10 min.

3. The ethylene polymer mixture of claim 2, wherein the first ethylene polymer and the second ethylene polymer have the melt indexes satisfying the following Equation 6:

$$1 \leq MI_2/MI_1 \leq 5 \quad \text{[Equation 6]}$$

wherein $MI_2$ is the melt index of the second ethylene polymer, $MI_1$ is the melt index of the first ethylene polymer, the melt index is measured at 190° C. under 2.16 kg in accordance with ASTM D 1238, and a unit of the melt index is g/10 min.

4. The ethylene polymer mixture of claim 1, wherein the ethylene polymer mixture includes 30 to 60% by weight of the first ethylene polymer.

5. The ethylene polymer mixture of claim 1, wherein the first ethylene polymer and the second ethylene polymer are an ethylene copolymer in which ethylene and a C3-C18 α-olefin comonomer are polymerized.

6. The ethylene polymer mixture of claim 5, wherein the α-olefin comonomer is any one or a mixture of two or more selected from the group consisting of 1-propylene, 1-butene, 1-hexene, 1-heptene, and 1-octene.

7. The ethylene polymer mixture of claim 5, wherein the first ethylene polymer and the second ethylene polymer are ethylene copolymers prepared in the presence of a metallocene catalyst.

8. The ethylene polymer mixture of claim 1, wherein the ethylene polymer mixture satisfies the following Equation 7:

$$HS_1 + 10 \leq HS_2 \qquad \text{[Equation 7]}$$

wherein $HS_1$ is a heat sealing temperature of the ethylene polymer mixture, $HS_2$ is a heat sealing temperature of one ethylene polymer having the same density, melt index, and molecular weight distribution as $HS_1$, and a unit of the temperature is ° C.

9. A molded article manufactured using the ethylene polymer mixture of claim 1.

10. The molded article of claim 9, wherein the molded article is any one selected from the group consisting of a film, a sheet, and a food container.

11. The molded article of claim 9, wherein the molded article is a film having a thickness of 10 to 250 μm and a haze of 5% or less in accordance with ASTM D 1003.

12. The molded article of claim 11, wherein the film has a falling dart impact strength of 1700 g or more in accordance with ASTM D 1709 method A, a lowest sealing temperature of 75° C. or less at a hot-tack strength of 1.5 N/cm or more in accordance with ASTM F 1921, and a lowest sealing temperature of 85° C. or less at a heat-seal strength of 600 g or more in accordance with ASTM F 88.

13. A multilayer film for food packaging comprising at least one layer of film or sheet manufactured using the ethylene polymer mixture of claim 1.

14. A method of preparing an ethylene polymer mixture, comprising: polymerizing ethylene and a C3-C18 α-olefin comonomer in the presence of a first metallocene catalyst in a first reactor to prepare a first ethylene polymer; and polymerizing ethylene and a C3-C18 α-olefin comonomer in the presence of a second metallocene catalyst in a second reactor to prepare a second ethylene polymer, wherein the first ethylene polymer and the second ethylene polymer have densities satisfying the following Equations 1 to 3 and the ethylene polymer mixture has a molecular weight distribution of 2 to 3:

$$0.87 \leq M_1 \leq 0.90 \qquad \text{[Equation 1]}$$

$$0.90 \leq M_2 \leq 0.92 \qquad \text{[Equation 2]}$$

$$0.015 \leq M_2 - M_1 \leq 0.030 \qquad \text{[Equation 3]}$$

wherein $M_1$ is a density of the first ethylene polymer, $M_2$ is a density of the second ethylene polymer, the density is measured in accordance with ASTM D-792, and a unit of the density is g/cc.

15. The method of preparing an ethylene polymer mixture of claim 14, wherein the first metallocene catalyst is a mixture of complexes represented by the following Chemical Formulas 1 and 2, and the second metallocene catalyst is a complex represented by the following Chemical Formula 3:

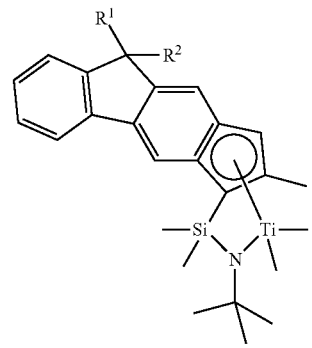

[Chemical Formula 1]

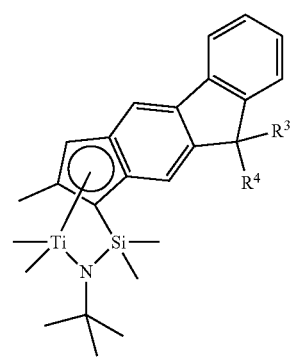

[Chemical Formula 2]

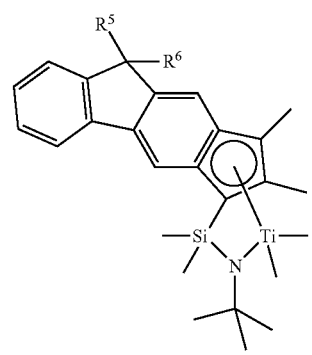

[Chemical Formula 3]

wherein $R^1$, $R^2$, $R^3$, $R^4$, $R^5$ and $R^6$ are $C_1$-$C_{30}$ alkyl independent of each other.

16. The method of preparing an ethylene polymer mixture of claim 15, wherein the first metallocene catalyst is a mixture in which the complex represented by Chemical Formula 1 and the complex represented by Chemical Formula 2 are mixed at a weight ratio of 3:7 to 7:3.

17. The method of preparing an ethylene polymer mixture of claim 14, wherein polymerization is performed so that the first ethylene polymer has a melt index satisfying the following Equation 4 and the second ethylene polymer has a melt index satisfying the following Equation 5:

$$0.2 \leq MI_1 \leq 0.9 \qquad \text{[Equation 4]}$$

$$1 \leq MI_2 \leq 3 \qquad \text{[Equation 5]}$$

wherein $MI_1$ is the melt index of the first ethylene polymer, $MI_2$ is the melt index of the second ethylene polymer, and the melt index is measured at 190° C. under 2.16 kg in accordance with ASTM D 1238 and a unit of the melt index is g/10 min.

18. The method of preparing an ethylene polymer mixture of claim 14, wherein in the polymerizing, hydrogen is injected to control a molecular weight.

19. The method of preparing an ethylene polymer mixture of claim 14, wherein in the polymerizing, any one or two or more cocatalysts selected from the group consisting of boron compounds and aluminum compounds are further included.

20. The method of preparing an ethylene polymer mixture of claim 19, wherein the cocatalyst is any one or a mixture thereof selected from the group consisting of triisobutylaluminum and triphenyl methylium tetrakis pentafluorophenyl borate.

* * * * *